(12) United States Patent
Smith et al.

(10) Patent No.: US 10,952,245 B1
(45) Date of Patent: Mar. 16, 2021

(54) MULTI-CLASS ORTHOGONAL FREQUENCY-DIVISION MULTIPLE ACCESS (OFDMA) SCHEDULING

(71) Applicant: Cisco Technology, Inc., San Jose, CA (US)

(72) Inventors: Malcolm Muir Smith, Richardson, TX (US); Jerome Henry, Pittsboro, NC (US); Xiaoqing Zhu, Austin, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/655,005

(22) Filed: Oct. 16, 2019

(51) Int. Cl.
| | |
|---|---|
| *H04W 72/04* | (2009.01) |
| *H04W 74/04* | (2009.01) |
| *H04W 72/12* | (2009.01) |
| *H04L 5/00* | (2006.01) |
| *H04L 29/08* | (2006.01) |

(52) U.S. Cl.
CPC ........... *H04W 74/04* (2013.01); *H04L 5/0007* (2013.01); *H04W 72/044* (2013.01); *H04W 72/12* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 9,699,807 B2 | 7/2017 | Ghosh et al. | |
| 10,356,664 B2 * | 7/2019 | Viger | H04W 72/0446 |
| 2017/0280462 A1 | 9/2017 | Chun et al. | |
| 2018/0027453 A1 | 1/2018 | Viger et al. | |
| 2018/0249507 A1 * | 8/2018 | Kudo | H04W 74/0816 |

OTHER PUBLICATIONS

Deng, Der-Jiunn et al. on Quality-Of-Service-Provisioning in IEEE 802.11AX WLANS, IEEE Access, vol. 4, pp. 6086-6104 (19 pages), Oct. 15, 2016.

(Continued)

*Primary Examiner* — Ayanah S George
(74) *Attorney, Agent, or Firm* — Merchant & Gould P.C.

(57) ABSTRACT

Multi-Class Orthogonal Frequency-Division Multiple Access (OFDMA) scheduling may be provided. A plurality of network devices may be assigned a transmission window for channel access. The plurality of network devices may include a first number of client devices and a second number of client devices. A first signal may be sent to the first number of network devices. The first signal may enable the first number of network devices to the channel access in a first portion of the transmission window. An amount of data to be exchanged by each of the second number of network devices may be determined. Based on the determined amount of data to be exchanged, a schedule may be determined for the channel access for each of the second number of network devices in a second portion of the transmission window. A second signal may be sent to the second number of network devices based on the determined schedule. The second signal may enable the second number of network devices to the channel access in the second portion of the transmission window.

20 Claims, 5 Drawing Sheets

(56) References Cited

OTHER PUBLICATIONS

Afaqui, M. Shahwaiz et al. IEEE 802.11 ax: Challenges and Requirements for Future High Efficiency Wi-Fi, IEEE Wireless Communications 2016 (10 pages); https://www.researchgate.net/publication/308171656; uploaded Jan. 1, 2018.
Selinis, Ioannis et al: "The Race to 5G Era; LTE and Wi-Fi", IEEE Access, vol. 6, pp. 56598-56636, XP011693652, DOI: 10.1109/Access.2018.2867729 [retrieved on Oct. 19, 2018] 40 pages.
Rajandekar, Ajinkya et al: "A Survey of MAC Layer Issues and Protocols for Machine-to-Machine Communications", IEEE Internet of Things Journal, IEEE, USA, vol. 2, No. 2, Apr. 1, 2015 (Apr. 1, 2015), pp. 175-186, XP011576138, DOI: 10.1109/J1OT.2015.2394438 [retrieved on Mar. 16, 2015] 4 pages.
Jiyang, Bai et al: "An adaptive grouping scheme in ultra-dense IEEE 802.11 ax network using buffer state report based two-stage mechanism", China Communications, China Institute of Communications, Piscataway, NJ, USA, vol. 16, No. 9, Sep. 1, 2019 (Sep. 1, 2019), pp. 31-44, XP011747817, ISSN: 1673-5447, DOI: 10.23919/JCC.2019.09.003 [retrieved on Sep. 27, 2019] 14 pages.
Ayush, Kumar et al: "EDIMA: Early Detection of IoT Malware Network Activity Using Machine Learning Techniques", 2019 IEEE 5th World Forum on Internet of Things (WF-IOT), IEEE, Apr. 15, 2019 (Apr. 15, 2019), pp. 289-294, XP033578596, DOI: 10.1109/WF-IOT.2019.8767194 [retrieved on Jul. 1, 2019] 6 pages.
International Search Report and Written Opinion issued in Application No. PCT/US2020/054999, dated Jan. 15, 2021, 18 pages.

* cited by examiner

MULTI-CLASS ORTHOGONAL FREQUENCY-DIVISION MULTIPLE ACCESS (OFDMA) SCHEDULING

TECHNICAL FIELD

The present disclosure relates generally to communication networks, and more particularly to wireless communications.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Presence of a large number of user devices with an access point results in competition among the user devices for available resources. In order to address the issue of increasing bandwidth requirements that are demanded for wireless communication systems, different schemes are being developed to allow multiple user terminals to communicate with a single access point by sharing the channel resources while achieving high data throughputs.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
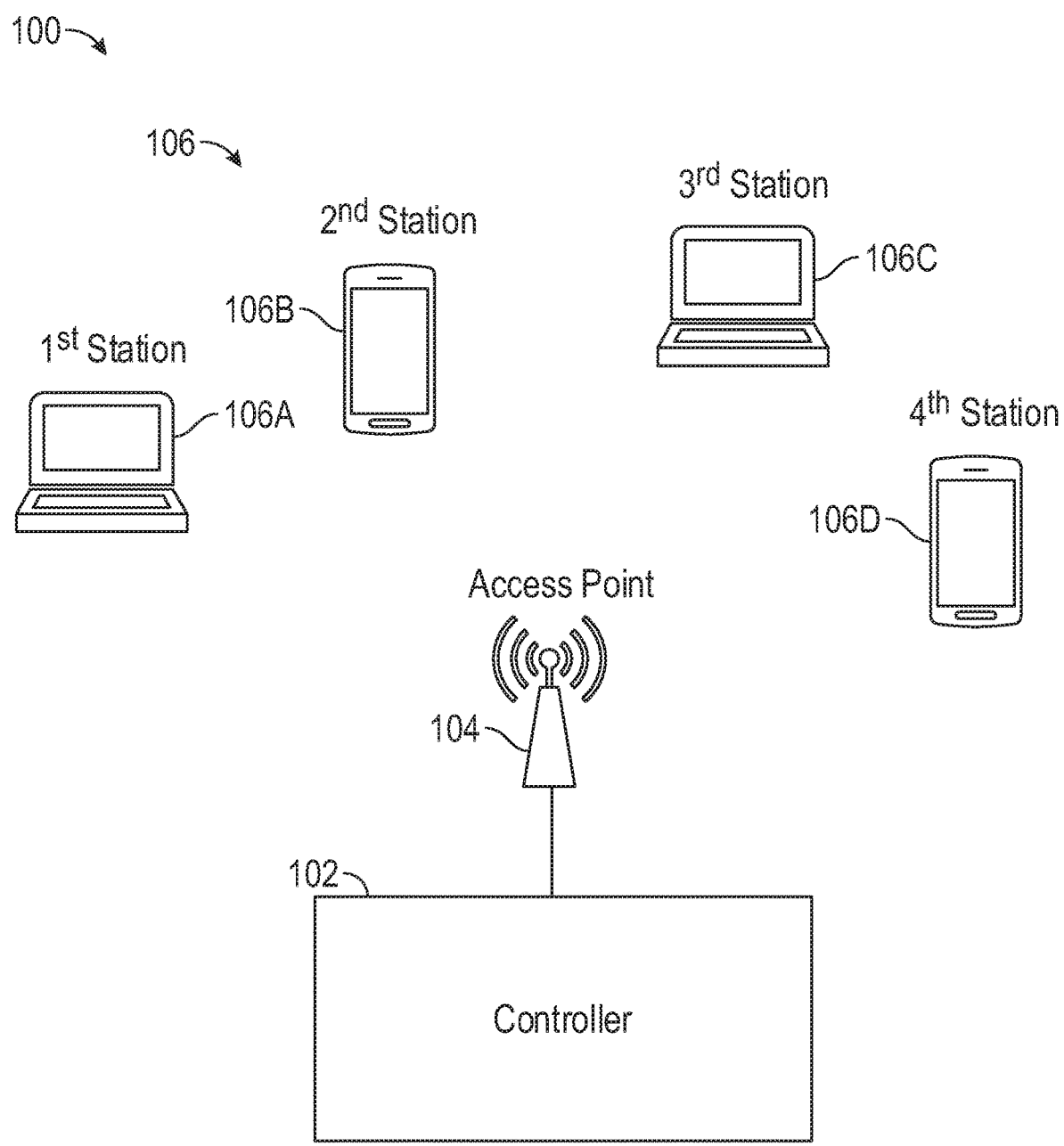
FIG. 1 is a block diagram of an operating environment.

Multi-Class Orthogonal Frequency-Division Multiple Access (OFDMA) scheduling may be provided. A plurality of network devices may be assigned a transmission window for channel access. The plurality of network devices may include a first number of client devices and a second number of client devices. A first signal may be sent to the first number of network devices. The first signal may be configured to enable the first number of network devices to the channel access in a first portion of the transmission window. An amount of data to be exchanged by each of the second number of network devices may be determined. Based on the determined amount of data to be exchanged, a schedule may be determined for the channel access for each of the second number of network devices in a second portion of the transmission window. A second signal may be sent to the second number of network devices based on the determined schedule. The second signal may be configured to enable the second number of network devices to the channel access in the second portion of the transmission window.

Both the foregoing overview and the following example embodiment are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

FIG. 1 illustrates an example operating environment 100 in which embodiments of the disclosure may be practiced. Operating environment 100 may provide, for example, a Wireless Local Area Network (WLAN) Basic Service Set (BSS) and may comprise a controller 102, an Access Point (AP) 104, and stations (STAs) 106. Controller 102 may coordinate with access point 104 to provide the WLAN in a predefined geographical area (i.e., a cell) to STAs 106. Access point 104 may implement a WLAN protocol specified in the IEEE 802.11 specification for example.

Access point 104 may wirelessly communicate with STAs 106. As shown in FIG. 1, STAs 106 may comprise a first STA 106A, a second STA 106B, a third STA 106C, and a fourth STA 106D. First STA 106A, second STA 106B, third STA 106C, and fourth STA 106D may comprise, but are not limited to, a cellular base station, a tablet device, a mobile device, a smart phone, a telephone, a remote control device, a set-top box, a digital video recorder, an internet of things (IoT) device, a personal computer, a network computer, a mainframe, a router, or other similar microcomputer-based device. The number of STAs 106 may grow or shrink and therefore may comprise any number of STAs and are not limited to four.

STAs 106 may be controlled by a configuration function (also referred to as a scheduler) that may determine when an STA may transmit and/or receive information via AP 104 (also referred to as a channel access). AP 104 may implement direct communication between STAs 106, such as point-to-point communication, where a channel is allocated for STAs 106 to communicate directly. STAs 106 may communicate with one or more other wireless communication devices and AP 104 using one or more wireless transmission technologies. The wireless transmission technologies employed may include, but are not limited to, near field communications (NFC), Bluetooth (BT), WiFi, as well as mobile phone technologies, such as WCDMA (Wideband Code Division Multiple Access), CDMA2000, UMTS (Universal Mobile Telecommunications System), GSM (Global System for Mobile communications), High Speed Packet Access (HSPA), and LTE (Long-Term Evolution, often referred to as 4G).

Operating environment 100 may implement an Orthogonal Frequency-Division Multiple Access (OFDMA) channelization as an aspect of the 802.11 WLAN. OFDMA may provide communication services to multiple STAs 106 in a single-bandwidth wireless medium. The OFDMA mode may use multiple subcarriers within a single channel that may be transmit to multiple STAs 106 simultaneously. The techniques used in the OFDMA may involve dividing a channel into multiple subcarriers. Different streams of information may be modulated, or mapped, onto subcarriers within the channel to communicate the information. Thus, the OFDMA mode may be employed to accommodate multiple users in a given bandwidth.

Operating environment 100 may be employed to perform Target Wake Time (TWT) techniques utilized in 802.11 WLAN, for example. In addition, operating environment 100 may further employ Uplink-Multiple User, Multiple-Input, Multiple-Output (UL-MUMIMO) modes. These modes may allow AP 104 to cause spatially diverse STAs 106 to send uplink traffic at the same time over different streams, in UL-MUMIMO modes, or by allowing AP 104 to schedule each of STAs 106 to only use a subset of the uplink transmission frame, in the OFDMA mode. However, the 802.11 specification may not describe how the TWT may be implemented, or how STAs 106 grouping may happen for either of the above-mentioned uplink modes beyond a basic Radio Frequency (RF) compatibility.

Conventional 802.11 OFDMA schedulers may be focused on optimal Resource Unit (RU) assignment to achieve a utility based outcome, such as proportional fairness (PF), in user throughput or Priority Queuing (PQ) in support of real-time traffic (e.g., voice). Other conventional OFDMA schedulers may be focused on conserving power and avoiding contention by grouping STAs 106 according to their expected transmission schedules. However, these conventional OFDMA schedulers may not provide optimal scheduling that may improve both the IoT and enterprise application scheduling.

The processes disclosed herein may provide a scheduling process that may account for different traffic types, relative urgency and importance of each flow, and predicted traffic, to optimally divide a Resource Allocation Window (RAW) assigned to STAs 106 into a Random Access (RA) phase and a Scheduled Access (SA) phase. A Transmit Opportunity (TXOP) (also referred to as channel access) for STAs 106 may be assigned between the RA phase and the SA phase based on the multiple constraints. For example, the 802.11 specifications may provide flexibility in how TWT Service Periods (SP) to each STAs 106 may be served by AP 104. However, the 802.11 specifications may only describe provisions about negotiated, hence expected wake-up time (minimum and maximum) and periodicity. A practical process for the TWT implementation may be left to the vendors. Furthermore, while only broadcast/multicast TWT SP and legacy non-TWT (e.g. UAPSD) traffic delivery may strictly be related to beacon/TIM intervals, an AP beacon may generally synchronize control-plane transactions (i.e., beacon/probe/probe-response/association, etc.) i.e. at the beginning of the RA phase.

In addition, the 802.11 specifications may provide operational mode flexibility for each TXOP (e.g., one TXOP may leverage SU, the next MU-MIMO, then MU-OFDMA, etc.). That is, the same operational mode may not be repeated from one TXOP to the next. Therefore, enterprise and unicast real-time TWT governed IoT devices may be scheduled in the same TXOP with the same mechanism. For example, enterprise and unicast real-time TWT governed IoT devices may be scheduled in the Downlink (DL) OFDMA with RU assignments to each class and Trigger-frame (TF) with Uplink (UL) OFDMA with per class RU assignment for the uplink. In addition, a post-beacon/Traffic Indication map (TIM) may not be an optimal time for scheduled delivery of large Physical Layer Convergence Protocol (PLCP) Protocol Data Units (PPDUs) as this may delay fast-roaming and the TWT negotiation processes and thus may negatively impact real-time handoff and IoT predictability performance. In any case, it may be more efficient in both compute and Bandwidth (BW) usage than separating the TWT and the OFDMA scheduling and delivery processes.

Furthermore, some enterprise IoT devices may not use the TWT for signaling traffic contracts. For example, real-time applications (e.g., voice) may be predominantly of the over-the-top (OTT) variety where no explicit Wi-Fi Multi-Media Access control (WMM-AC) (e.g. Traffic Specification (TSPEC)) signaling may be used to indicate demand.

Therefore, Machine Learning (ML) may be used to ascertain relevant Key Performance Indicators (KPIs) of value to the enterprise applications. For example, the delay/jitter constraints for the real-time classic enterprise and ideal serving interval/period for the IOT and the enterprise may be learned using the ML. The IoT traffic then may be divided in re-occurring and trigger-based groups, and each type may have learnable burst characteristics that may be learned through supervised learning and from IoT parameters, for example, Manufacturer Usage Description (MUD) files. A MUD file for a STA may indicate an uplink traffic characterization for the STA, a management characterization for the STA, and an emergency group type for the STA.

In example embodiments, a plurality of network devices, for example STAs 106, may be assigned channel access in a resource allocation window. A post-beacon period of observation (TO) may be defined in the RA phase in which a scheduler may operate in the RA mode (i.e., non-MU-OFDMA mode). The TO may be followed by a period of scheduled delivery (TS) in which the scheduler may operate in the SA mode (i.e., MU-OFDMA mode). During the TO, a lightweight short-lived ML may be applied to learn a transmission pattern of the real-time enterprise traffic (e.g., one small packet every 20 ms for a VoIP flow) and retrieve their delay/jitter bound needs (e.g., lower than 50 ms HOL delay for VoIP flows) via a separate knowledge base (e.g., through controller 102). Moreover, during the TO, an absolute time delivery needs (e.g., in 200 ms then every 500 ms) and the remaining non-real-time needs (which may be assigned a soft-delay bound based on Airtime Fairness (ATF) or Proportional Fairness (PF)) may be learned via TWT/MUD.

In conjunction with the need assessment, a relative priority (e.g. based on policy) may be assigned to the flows such that the critical IoT and enterprise application may be served irrespective of the presence of less critical flows or their intended volume. Given the three sources of time constraints, that is, real-time delay bounds, absolute time contracts and soft-delay, and their respective demands (i.e., RU needs based on current Modulation Coding Scheme (MCS)), a series of DL-OFDMA and TF UL-OFDMA transactions may be constructed with the RU assignments and thus re-compute the TO/TS boundaries.

As more knowledge is gained about existing flows, a higher percentage of the RAW may be dedicated to serving flows in the SA phase, thus saving on the overhead of traffic status polling (e.g., Buffer Status Report Poll (BSRP)/BSR transactions for uplink flows). This may lead to higher efficiency of overall air time use. For example, as STAs 106 and their flow needs are scheduled (hence moving from the RA phase to the SA phase), the RAW usage (e.g., offered versus taken) may be observed and assignment of STAs 106 may be altered to the RA phase versus the SA phase. That is, if a non-critical STA may only consume X % of RAWs, then its allocation (i.e., next TXOP) may be reduced forcing a non-critical STA to use the RA phase. In example embodiments, the processes disclosed herein may apply for the entire SA/TS period and not just a single TXOP.

Figure 2:
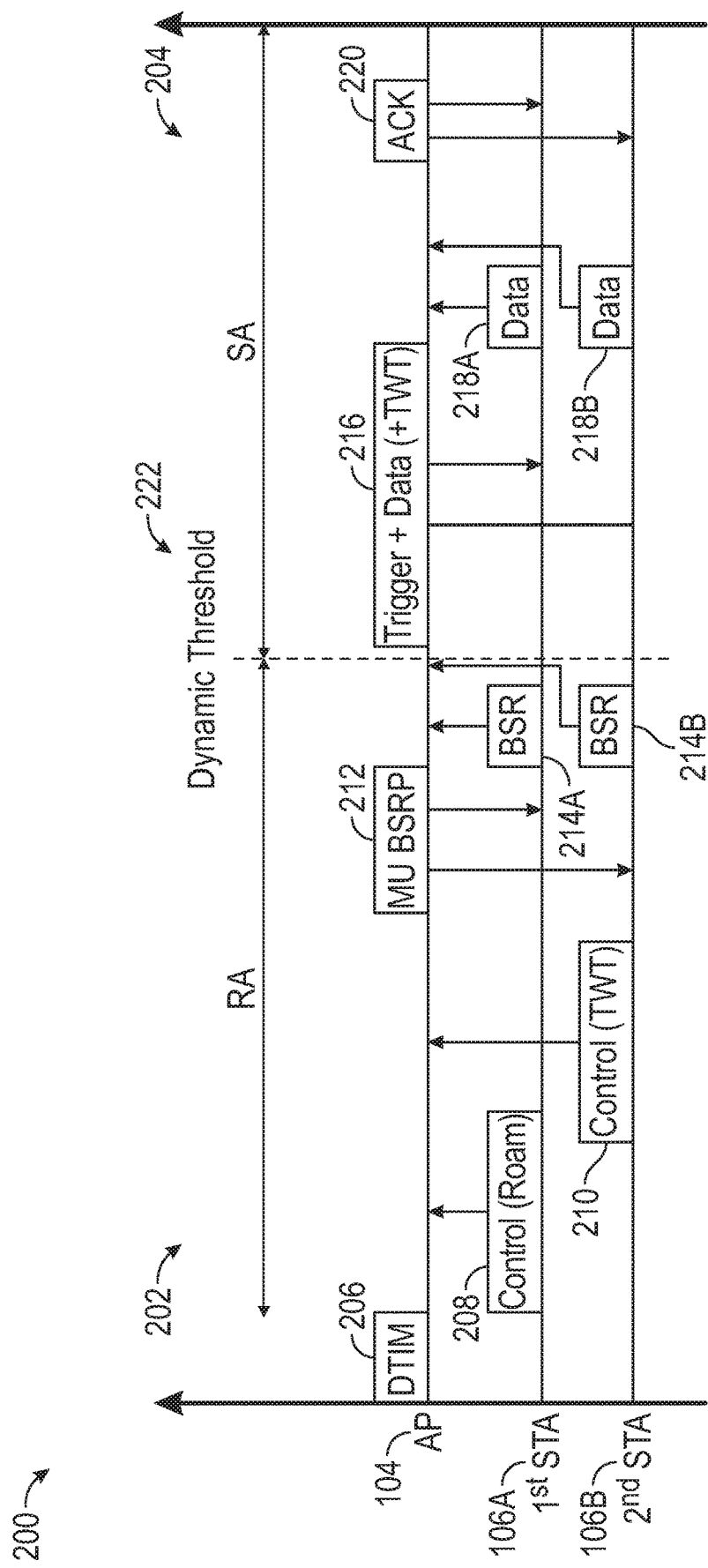
FIG. 2 is a diagram illustrating an example resource allocation window.

FIG. 2 is a diagram illustrating an example RAW 200. As shown in FIG. 2, RAW 200 may be partitioned into a first portion 202 and a second portion 204 by a dynamic threshold 222. Consistent with embodiments of the disclosure, RAW 200 may comprise a transmission window, first portion 202 may comprise a first portion of the transmission window (also referred to as the RA phase), and second portion 204 may comprise a second portion of the transmission window (also referred to as the SA phase). In the RA phase, the channel access may be allocated with a low-complexity Round Robin (RR) channel access mode where time slices are assigned to each STA 106 in equal portions and in a circular order without priority.

In example embodiments, STAs 106 may be assigned to operate in the RA phase and the SA phase based on knowledge of delivery needs (also referred to as demand information). STAs 106 may be categorized based on the knowledge of the demand information. For example, an STA for which there is no knowledge of data delivery needs (also referred to as demand information) may be categorized to be in an initial mode. Moreover, an STA for which the demand information is known may be categorized to be in a requested mode. In addition, an STA for which demand information is predicted through a learning process may be categorized to be in a predicted mode. At the beginning of transmission cycles, almost all of STAs 106 may be categorized to be in the initial mode as the demand information may not be known or predicted for any STAs 106. With completion of each transmission cycle, the demand information may be collected or predicted for a portion of STAs 106. The portion of STAs 106 for which the demand information is collected to predict may then be re-categorized from the initial mode to the requested mode or the predicted mode, respectively. For STAs 106 in the initial mode, the channel access is scheduled in first portion 202, that is, in the random access phase. In contrast, for STAs 106 in the requested mode and the predicted mode, the channel access may be scheduled in second portion 204, that is, in the scheduled access phase. Scheduling may be organized around a Delivery Traffic Indication Message (DTIM) 206.

Continuing with FIG. 2, $1^{st}$ STA 106A and $2^{nd}$ STA 106B may each exchange a control roam 208 message and a control TWT 210 message in the RA phase. In addition, a scheduler may send an MU BSRP message 212 to each of $1^{st}$ STA 106A and $2^{nd}$ STA 106B. $1^{st}$ STA 106A and $2^{nd}$ STA 106B may each respond to MU BSRP message 212 by a first BSR message 214A and a second BSR message 214B, respectively. Based on signaled demand (i.e., the BSR and the TWT), $1^{st}$ STA 106A and $2^{nd}$ STA 106B may transition to the SA phase and the channel access may be allocated via PF/ATF and TWT contracts. For example, the scheduler may send a trigger, data, and the TWT 216 to $1^{st}$ STA 106A and $2^{nd}$ STA 106B. In response to the trigger, $1^{st}$ STA 106A and $2^{nd}$ STA 106B may each exchange first data 218A and second data 218B, respectively, over an accessed channel. An acknowledgement (ACK) 220 may be received by $1^{st}$ STA 106A and $2^{nd}$ STA 106B confirming a completion of the data exchange. Polling may now exclude $1^{st}$ STA 106A and $2^{nd}$ STA 106B. In example embodiments, first portion 202 and second portion 204 may grow and shrink as STAs 106 transition from the initial to requested and then to predicted scheduling states. That is, dynamic threshold 222 may change its position as more and more STAs 106 move from first portion 202 to second portion 204.

Figure 3:
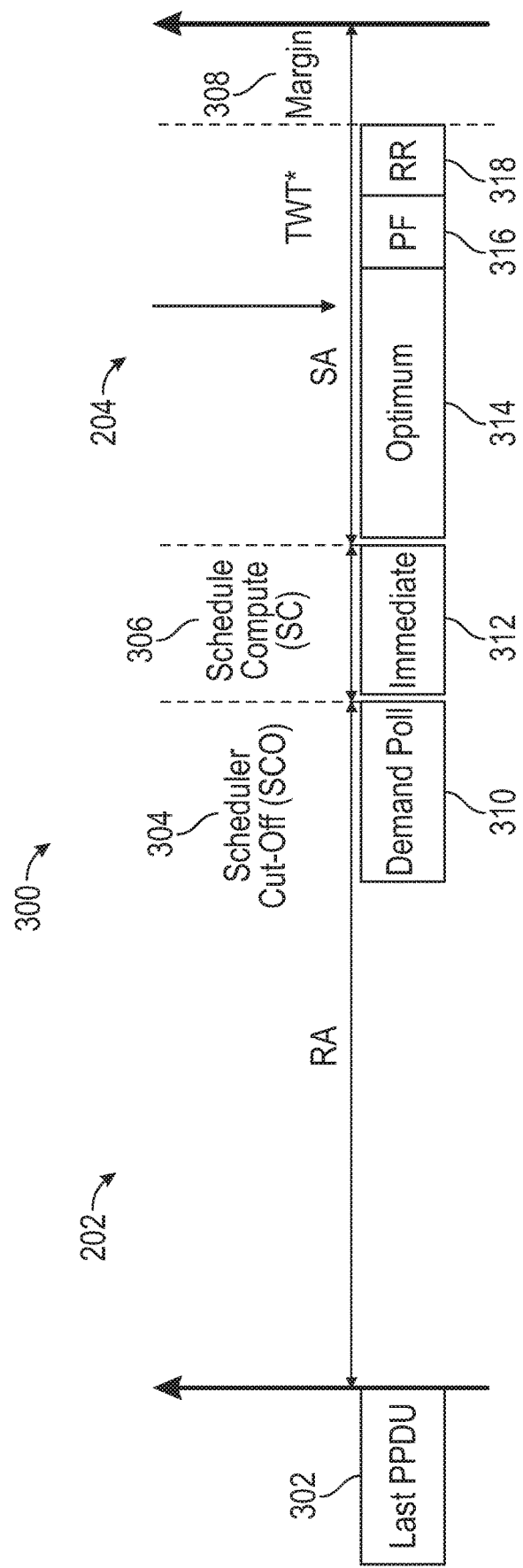
FIG. 3 is a diagram illustrating another example resource allocation window.

FIG. 3 illustrates an example diagram illustrating another example RAW 300. As shown in FIG. 3, RAW 300 may include first portion 202 and second portion 204. In addition, RAW 300 may include a demand poll phase 310, an immediate phase 312, an optimum phase 314, a PF phase 316, and a RR phase 318. A scheduler cycle may start at the end of a PPDU 302 following a beacon, and may schedule a first number of STAs 106 in the RA phase, that is, in first portion 202. Traffic accumulated until a demand poll is issued (TF BSRP/BSR) may be timed to end at a scheduler-cut-off (SCO) time 304. In the RA phase, the scheduler may allow roaming, learn immediate needs, and determine schedule compute 306. For example, the scheduler may sort STAs 106 into immediate (e.g., control or ACK) and non-immediate (i.e., optimum portion 314 allocation) STA and may kick off schedule compute 306 task. STAs 106 sorted as an immediate STA may be scheduled in immediate phase 312.

In the SA phase, that is, second portion 204, inputs (for example, an expiration time, a HOLDelay, a Qdelay, a Rate, etc.) may be considered to form an optimum schedule (for optimum portion 314) which may be executed prior to PF phase 316 (that is, requested schedule) and RR phase 318 (that is, random schedule) phases. A margin (M) 308 may be computed based on observation of Single User/Carrier Sense Multiple Access (SU/CSMA) PPDUs in the RA phase and the SA phase. For example, if on average approximately 10% of first portion 202 and second portion 204 was SU, then margin (M) 308 may be determined to be 10 Time Unit (TU).

In example embodiments, as an STA moves from the initial mode, to the requested mode, and then to the predictive mode, the scheduler may have more demand information for the STA. For example, the scheduler may not have any demand information for the STA in the initial mode. However, for an STA in the requested mode, the scheduler may either have a per-Traffic Identifier (TID) BSR or a negotiated TWT SP. In addition, for a STA in the predicted mode, the scheduler may have an estimate of a future demand of the STA (for example, per-TID). In example embodiments, an STA may move from the initial mode to the requested mode via demand poll 310. Since a number of STAs 106 per poll may be limited and the process has cost, AP 104 may select STAs 106 that have high-likelihood of demand (from previous cycles), but may also include a number of STAs 106 in the initial mode.

The scheduler may optimize the channel access in the SA phase. For example, optimum phase 314 of the SA phase may be optimized by using, for STAs 106 in the predicted mode, an OFDMA DL+UL cascade based on demand. Similarly, PF phase 316 may be optimized by using, for the requested mode STAs 106 (per-TID BSR) per-TID PF (i.e. highest utility rate). In addition, RR phase 318 may be optimized by using a low-priority demand poll followed by a minimal allocation of RAW 300 as catch-all demand for the remaining STAs 106 (i.e. not part of demand poll 310 or still in initial mode). This may catch STAs 106 which may not be able to signal demand otherwise.

In each transmission cycle, margin 308 (e.g., M) may be computed based on a sliding-window time averaging of previous beacon periods SU/RA and OBSS air-time utilization, which initially may be high because the SA phase has not occurred yet. The SA phase (i.e., second portion 204) may be determined as a sum optimum phase 314, PF phase 316, and RR phase 318. Optimum phase 314 may be determined based on a demand from the predicted mode STAs 106. Initially, the SA phase may be 0 because no STA may be known, but may grow to 1−min(RA+SC+DP)phase [multiple TXOPs]. Similarly, PF phase 316 may be determined based on a demand from the requested mode STAs 106 less a demand from the newly known STAs 106 (i.e. STAs 106 which moved to the predicted mode).

In addition, RR phase 318 may be determined based on a time to poll and serve minimal RU to unknown STAs 106. Then, the RA phase (i.e., first portion 202) may be estimated based on 1-SA-SC-time (DP)-M, where time (DP) represents time for demand poll 310. Demand poll phase 310 may be adjusted from all STAs 106 to a number of unknown STAs 106 (i.e. as a number of predicted STA increases). Schedule compute 306 may be adjusted based on a measured compute time (initially low). Movement from the initial phase to the requested phase for an STA may be driven by the STA. In such movement, a per-TID/AC BSR and negotiated TID may originate from the moving STA.

In some embodiments, the movement from the requested mode to the predicted mode may be driven by AP 104. Since an STA may be underserved (e.g., not in BSPR/BSR cycle, use of SU/CSMA), it may be important to predict demand in order to serve the STA effectively. Hence, in AP 104 driven movement, learning per-TID patterns for the moving STA may be key to organizing the SA phase.

In example embodiments, the process disclosed herein may use a two-tier learning approach. A first tier of the two-tier approach may be learning a beacon scale (e.g., 100s of TUs) and a second tier may be learning a cloud scale (e.g., seconds-minutes). The first tier may use Application Visibility Control/Network Based Application Recognition (AVC/NBAR) to classify the flows into a real-time interactive, a non-real-time, etc. In addition, the first tier may also determine a PDF of inter-arrival and a size. If a low correlation is found (e.g., Web traffic), the flow may be deemed as unknown. The second tier may crowd-source the first tier metrics over a number of WLANs to refine the PDFs of inter-arrival and the size.

Figure 4:
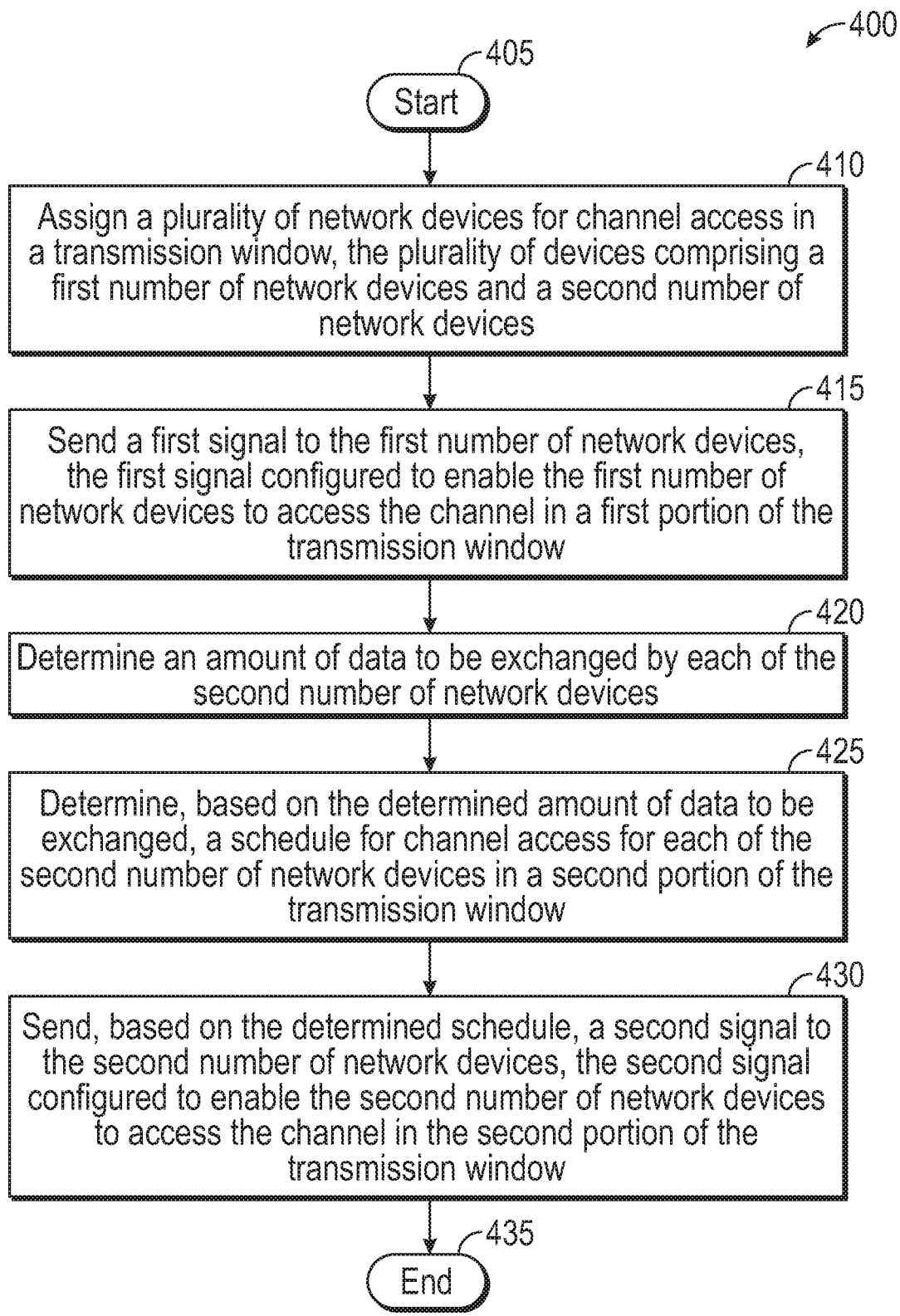
FIG. 4 is a flow chart of a method for providing Multi-Class Orthogonal Frequency-Division Multiple Access (OFDMA) scheduling.

FIG. 4 is a flow diagram illustrating a method for a multi-class 802.11 OFDMA scheduling. Method 400 may be implemented by any of controller 102, access point 104, or STAs 106 as described above with respect to FIG. 1. In addition, method 400 may be implemented by computing device 500 as described in more detail below with respect to FIG. 5, which may comprise a working environment for any of controller 102, access point 104, or STAs 106. Ways to implement the stages of method 400 will be described in greater detail below.

Method 400 may begin at block 405 and proceed to block 410 where a plurality of network devices may be assigned for channel access in a transmission window. The plurality of network devices may comprise a first number of network devices and a second number of network devices. For example, STAs 106 may be assigned for channel access in RAW 200 or RAW 300. STAs 106 may be assigned in RAW 200 or RAW 300 based on their transmission needs (e.g., transmission interval, transmission volume, etc.), predictability, duration, variation, and/or emergency levels. The assignments may be changed dynamically based on environmental conditions (e.g., fire alarms, etc.). For example, behavioral profiles of STAs 106 may be determined. The behavioral profile for a particular STA may indicate whether the STA is an occasional transmitter or a periodic transmitter. Similarly behaving STAs may be identified based on their behavioral profiles. Groups of STAs 106 may be assigned to uplink transmission windows based on their behavioral profiles. The similarly behaving STAs 106 that are periodic transmitters may be assigned to the same uplink transmission windows and similarly behaving STAs 106 that are occasional transmitters may be assigned to different uplink transmission windows. Assigning STAs 106 to a transmission window based on the behavior is an example and other processes may be used for assigning STAs 106 into transmission windows.

After assigning the transmission window to a plurality of network devices at block 410, method 400 may proceed to block 415 where a first signal may be sent to the first number of network devices. The first signal may be configured to enable the first number of network devices to access the channel in a first portion of the transmission window. For example, a first number of STAs 106 may be scheduled for to access the channel in first portion 202 of RAW 200 or RAW 300 and scheduled to exchange data in the RA phase. The first signal may be a trigger signal or a wake up signal.

Once having sent the first signal to the first number of network devices at block 410, method 400 may proceed to block 415 where an amount of data to be exchanged by each of the second number of network devices may be determined. The amount of data to be exchanged may be determined using a demand poll. In addition, the amount of data to be exchanged may be determined using a learning process. For example, the amount of data to be exchanged may be determined by learning from the amount of data exchanged during the previous cycles. In addition, the amount of data to be exchanged may be determined from MUD files.

After determining the amount of data to be exchanged by the second number of the network devices at block 420, method 400 may proceed to block 425 where a schedule for the each of the second number of network devices in a second portion of the transmission window may be determined based on the amount of data to be exchanged. For example, the second number of network devices may be scheduled the channel access in second portion 204 of RAW 200 or RAW 300 in the SA phase.

Once having determined the schedule for the second number of network devices at block 425, method 400 may proceed to block 430 where a second signal may be sent to the second number of network devices. The second signal may be configured to enable the second number of network devices to the access the channel in second portion 204 of the transmission window. After sending the second signal to the second number of network devices of the first plurality of network devices at block 430, method 400 may end at block 435.

Figure 5:
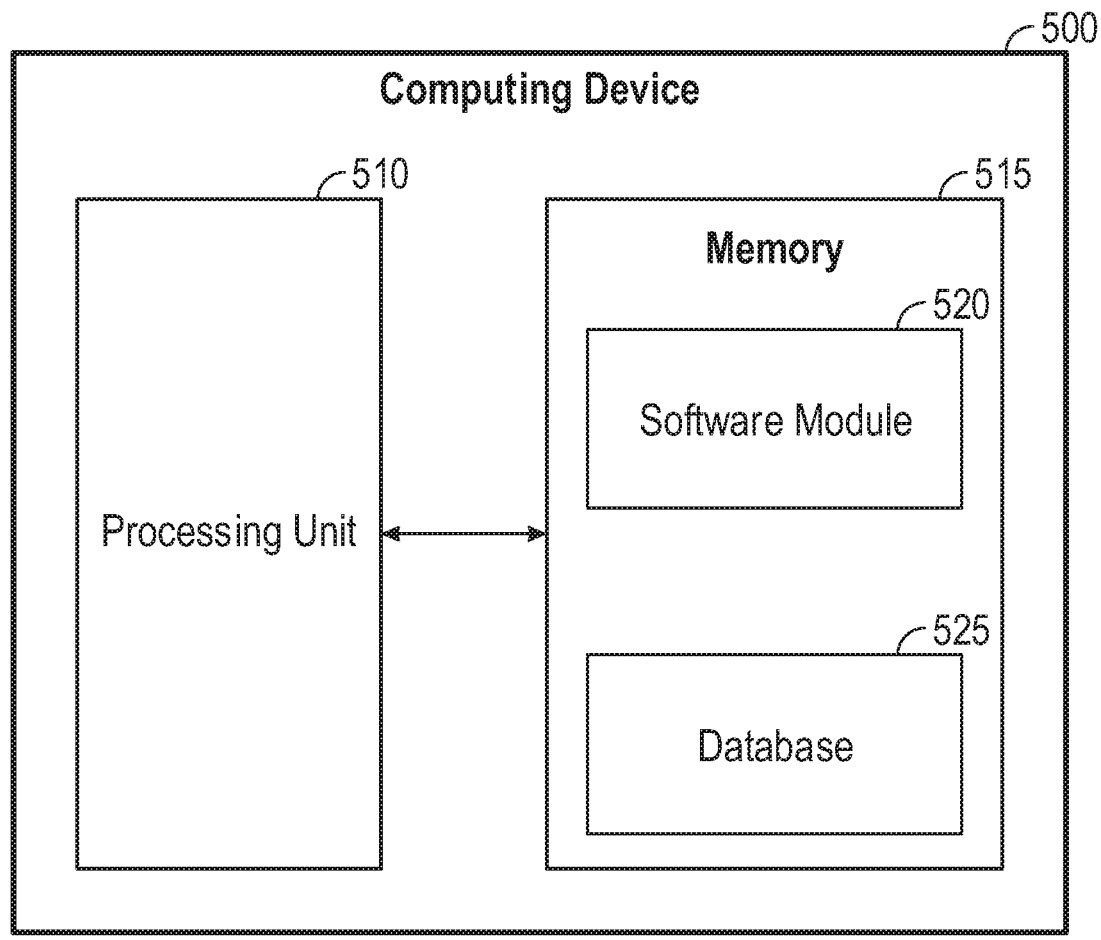
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform processes for providing Multi-Class Orthogonal Frequency-Division Multiple Access (OFDMA) scheduling, including for example, any one or more of the stages from method 400 described above with respect to FIG. 4. Computing device 500, for example, may provide an operating environment for controller 102, access point 104, and ones of STAs 106. Controller 102, access point 104, and STAs 106 may operate in other environments and are not limited to computing device 500.

Computing device 500 may be implemented using a personal computer, a network computer, a mainframe, a router, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
assigning a plurality of network devices for channel access in a transmission window, the plurality of network devices comprising a first number of network devices and a second number of network devices;
sending a first signal to the first number of network devices, the first signal configured to enable the first number of network devices to access the channel in a first portion of the transmission window;
determining an amount of data to be exchanged by each of the second number of network devices;
determining, based on the determined amount of data to be exchanged, a schedule for channel access for each of the second number of network devices in a second portion of the transmission window; and
sending, based on the determined schedule, a second signal to the second number of network devices, the second signal configured to enable the second number of network devices to access the channel in the second portion of the transmission window.

2. The method of claim 1, wherein assigning the plurality of network devices for channel access in the transmission window comprises partitioning the transmission window into the first portion and the second portion.

3. The method of claim 1, wherein assigning the plurality of network devices for channel access in the transmission window further comprises scheduling the channel access for the first number of network devices in a random access phase in the first portion of the transmission window and scheduling the channel access for the second number of network devices in a scheduled access mode in the second portion of the transmission window.

4. The method of claim 3, wherein scheduling the channel access for the second number of network devices in the scheduled access mode in the second portion of the transmission window comprises assigning the second number of network devices in one of: an optimum channel access phase, a performance fairness channel access phase, and a round robin channel access phase.

5. The method of claim 3, wherein scheduling the channel access for the second number of network devices in the scheduled access mode in the second portion of the transmission window comprises performing a demand poll for the second number of network devices.

6. The method of claim 1, further comprising moving a subset of the first number of network devices from the first portion of the transmission window to the second portion of the transmission window.

7. The method of claim 6, further comprising adjusting a length of each of the first portion of the transmission window and the second portion of the transmission window in response to moving the subset of the first number of network devices from the first portion of the transmission window to the second portion of the transmission window.

8. The method of claim 1, wherein assigning the plurality of network devices for channel access in the transmission window comprises assigning the plurality of network devices for channel access in the transmission window based on behavior profiles of the plurality of network devices.

9. The method of claim 1, wherein determining the amount of data to be exchanged for the second number of network devices comprises determining the amount of data to exchanges by a remaining of the plurality of network devices, and wherein determining the amount of data to be exchanged for the second number of network devices comprises determining the amount of data to be exchanged using a demand poll.

10. The method of claim 1, further comprising obtaining Manufacturer Usage Description (MUD) files for the plurality of network devices, wherein the MUD files indicate an uplink traffic characterization for the plurality of network devices, a management characterization for the plurality of network devices, and an emergency group type for the plurality of network devices.

11. An apparatus comprising:
a memory storage; and
a processing unit coupled to the memory storage, wherein the processing unit is operative to:
group a plurality of network devices for channel access in a transmission window based on behavior profiles of the network devices, the plurality of network devices comprising a first number of network devices and a second number of network devices;
send a first signal to the first number of network devices, the first signal configured to enable the first number of network devices to access the channel in a first portion of the transmission window;
determine an amount of data to be exchanged by the second number of network devices;
determine, based on the amount of data to be exchanged, a schedule for channel access for each of the second number of network devices in a second portion of the transmission window; and
send, based on the schedule, a second signal to the second number of network devices, the second signal configured to enable the second number of network devices to access the channel in the second portion of the transmission window.

12. The apparatus of claim 11, wherein the plurality of network devices comprises Internet of Things (IoT) devices.

13. The apparatus of claim 11, wherein the behavior profiles are obtained from Manufacturer Usage Description (MUD) files for the plurality of network devices, and wherein the MUD files indicate an uplink traffic characterization, a management characterization, and an emergency group type for the plurality of network devices.

14. The apparatus of claim 11, wherein each of the first signal and the second signal comprises a target wake time message.

15. The apparatus of claim 11, wherein the channel access comprises an Orthogonal Frequency-Division Multiple Access channel access.

16. The apparatus of claim 11, wherein the transmission window further comprises a optimum portion, a performance fairness portion, a round robin portion, and a margin portion.

17. A non-transitory computer readable medium that stores a set of instructions which when executed perform a method executed by the set of instructions comprising:
assigning, based on behavior profiles, a plurality of network devices for channel access in a transmission window, the plurality of network devices comprising a first number of network devices and a second number of network devices;
sending a first signal to the first number of network devices, the first signal configured to enable the first number of network devices to access the channel in a random access mode in a first portion of the transmission window;
determining an amount of data to be exchanged by each of the second number of network devices;
determining, based on the amount of data to be exchanged, a schedule for channel access for each of the second number of network devices in a second portion of the transmission window; and
sending, based on the determined schedule, a second signal to the second number of network devices, the second signal configured to enable the second number of network devices to access the channel in a schedule access mode in the second portion of the transmission window.

18. The non-transitory computer readable medium of claim 17, further comprising determining a margin for the transmission window.

19. The non-transitory computer readable medium of claim 17, further comprising adjusting a length of each of the first portion of the transmission window and the second portion of the transmission window.

20. The non-transitory computer readable medium of claim 19, wherein adjusting the length of each of the first portion of the transmission window and the second portion of the transmission window comprises adjusting the length of each of the first portion of the transmission window and the second portion of the transmission window in response to moving a subset of the first number of network devices from the random access mode to the scheduled access mode.

* * * * *